(12) United States Patent
Bollinger, III

(10) Patent No.: US 12,549,584 B2
(45) Date of Patent: Feb. 10, 2026

(54) SYSTEMS, METHODS AND COMPUTER PROGRAM PRODUCTS FOR BRANCHING BASED AUTOMATION DRIVEN ANALYSIS

(71) Applicant: Squirrel Compliancy Solutions, Inc., Raleigh, NC (US)

(72) Inventor: Gilbert Harry Bollinger, III, Pembroke Pines, FL (US)

(73) Assignee: Squirrel Compliancy Solutions, Inc., Raleigh, NC (US)

( * ) Notice: Subject to any disclaimer, the term of this patent is extended or adjusted under 35 U.S.C. 154(b) by 91 days.

(21) Appl. No.: 18/059,521

(22) Filed: Nov. 29, 2022

(65) Prior Publication Data

US 2023/0171282 A1    Jun. 1, 2023

Related U.S. Application Data

(60) Provisional application No. 63/264,677, filed on Nov. 30, 2021.

(51) Int. Cl.
*H04L 9/40* (2022.01)
*G06F 21/57* (2013.01)

(52) U.S. Cl.
CPC ........ *H04L 63/1433* (2013.01); *G06F 21/577* (2013.01); *H04L 63/102* (2013.01); *H04L 63/20* (2013.01)

(58) Field of Classification Search
CPC ... H04L 63/1433; H04L 63/102; H04L 63/20; G06F 21/577
See application file for complete search history.

(56) References Cited

U.S. PATENT DOCUMENTS

| | | | | |
|---|---|---|---|---|
| 10,521,550 B2* | 12/2019 | Drumm | ............ | G05B 19/41885 |
| 10,623,440 B2* | 4/2020 | Al Hamami | .......... | G06F 21/554 |
| 11,310,261 B2* | 4/2022 | Hawthorn | ............ | H04L 63/1433 |
| 2008/0262990 A1* | 10/2008 | Kapoor | ................. | H04L 63/145 |
| | | | | 706/20 |
| 2013/0138619 A1* | 5/2013 | Krislov | ............... | G06F 21/6209 |
| | | | | 707/695 |
| 2016/0300001 A1* | 10/2016 | Drumm | ................... | G05B 17/02 |
| 2017/0034200 A1* | 2/2017 | Costin | ................... | G06F 21/577 |
| 2018/0219894 A1* | 8/2018 | Crabtree | ................. | H04L 63/20 |

(Continued)

*Primary Examiner* — Cheng-Feng Huang
(74) *Attorney, Agent, or Firm* — Stanek Lemon Crouse & Meeks, PA

(57) ABSTRACT

Systems for identifying vulnerabilities in an environment are provided. The system includes a security module that receives information from one or more assets in a target environment, wherein the security module has a underlying knowledge of details associated with each of the one or more assets; evaluates the received information from each of the one or more assets to identify any security vulnerabilities; applies one or more rules to received information provided by assets having identified security issues, wherein the one or more rules trigger a plurality of logic flows that analyze the received information provided by assets having identified security issues, the logic flows configured to infinitely branch during analysis of the received information until a decision is determined for each of the assets having identified security issues; and generates a remedial process to address the identified security issues based on the determined decision for each of the assets.

19 Claims, 9 Drawing Sheets

(56) References Cited

U.S. PATENT DOCUMENTS

| | | | |
|---|---|---|---|
| 2021/0021632 A1* | 1/2021 | Hawthorn | H04L 63/1433 |
| 2021/0400063 A1* | 12/2021 | Tackabury | H04L 63/1425 |
| 2022/0232031 A1* | 7/2022 | Bogren | H04L 63/102 |
| 2022/0278993 A1* | 9/2022 | Korakin | H04L 63/20 |

* cited by examiner

| FUNCTIONAL COMPONENTS | SOLUTION COMPONENTS | TECHNOLOGY COMPONENTS |
|---|---|---|
| ASSET MANAGEMENT | NOTIFICATION & REMINDERS ENGINE | FRONT-END UI SCREENS |
| RISK MANAGEMENT FRAMEWORK INTEGRATION & UPDATES | RBAC (ROLE-BASED ACCESS CONTROL) | DEDICATED PORTAL |
| RULES DESIGNER & AUTOMATION ENGINE | PORTAL ADMINISTRATION | BACKEND DATABASE |
| WAIVERS-PLAN OF ACTION & MILESTONES (POAM) & RISK ACCEPTNCE (RA) | QUERY BUILDER | PROGRAMMING INTERFACES |
| DASHBOARDS & REPORTS | PLATFORM AND DATA ACCESS SECURITY | PLATFORM DEPLOYMENT PACKAGES FOR VIRTUAL MACHINES |
| PROCESS, SECURITY CONTROL AUDITS CREATION, SCHEDULING AND REPORTING | ANALYTICS ENGINE FOR INSIGHTS ON VULNERABILITIES, REMEDIATION AND PLATFORM EFFICIENCY | PLATFORM PATCH STRATEGY FOR SEAMLESS UPGRADES |
| VULNERABILITIES MANAGEMENT - DETECTION, REMEDIATION AND HANDLING | AUDIT SCHEDULER AND EVENTS CALENDAR | MODULAR ARCHITECTURE |
| MANAGEMENT OF POLICIES, COMMANDS, PLATFORM AND TAGS | DATA IMPORT AND EXPORT | BUILT-IN HIGH PERFORMANCE AND SCALABILITY |
| USER ADMINISTRATION & LICENSE MANAGEMENT | STAND-ALONE (OFFLINE MODE) PLATFORM USAGE | HIGH AVAILABILITY DESIGN WITH WARM AND COLD BACKUPS |

FIG. 4

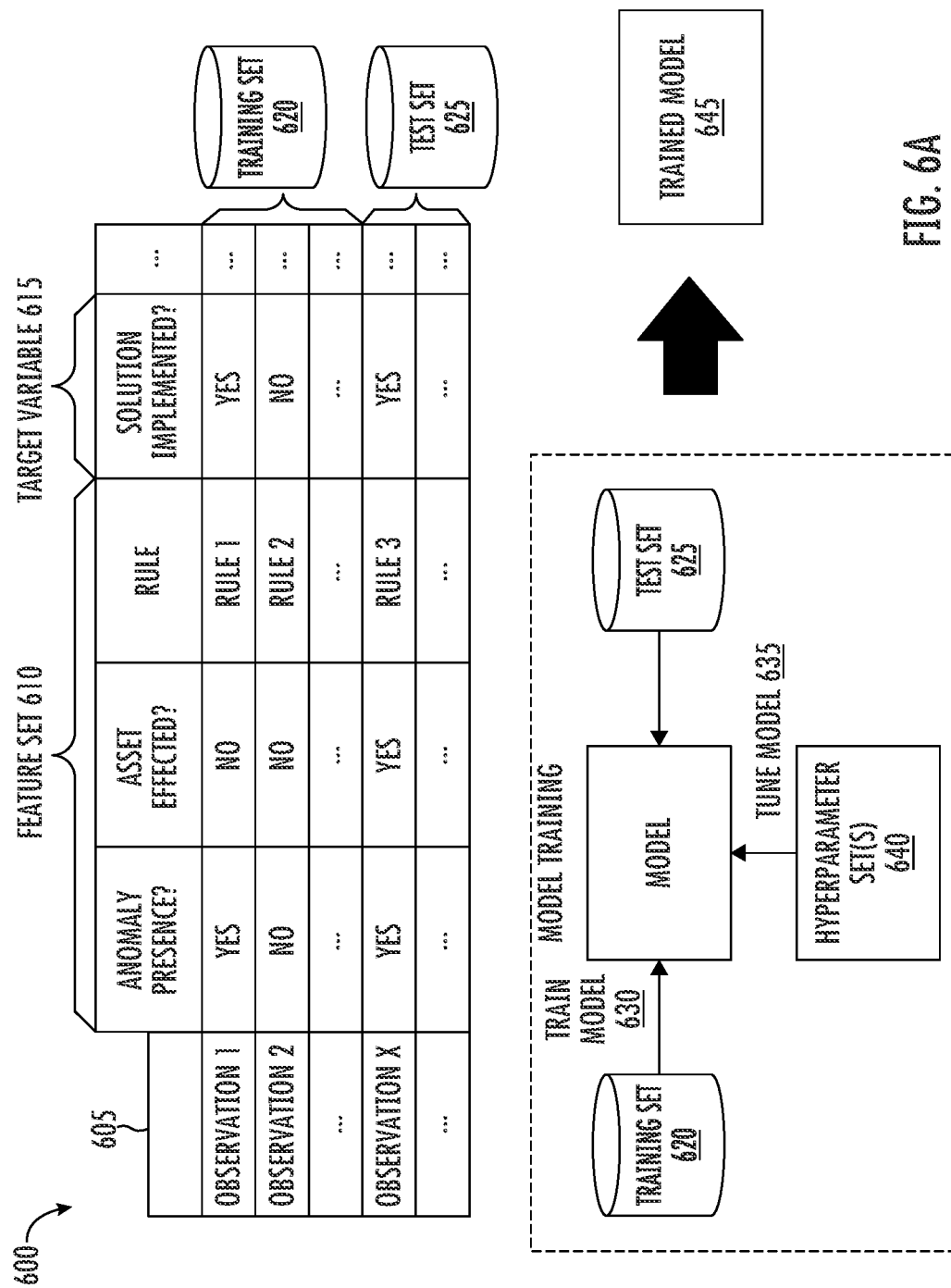

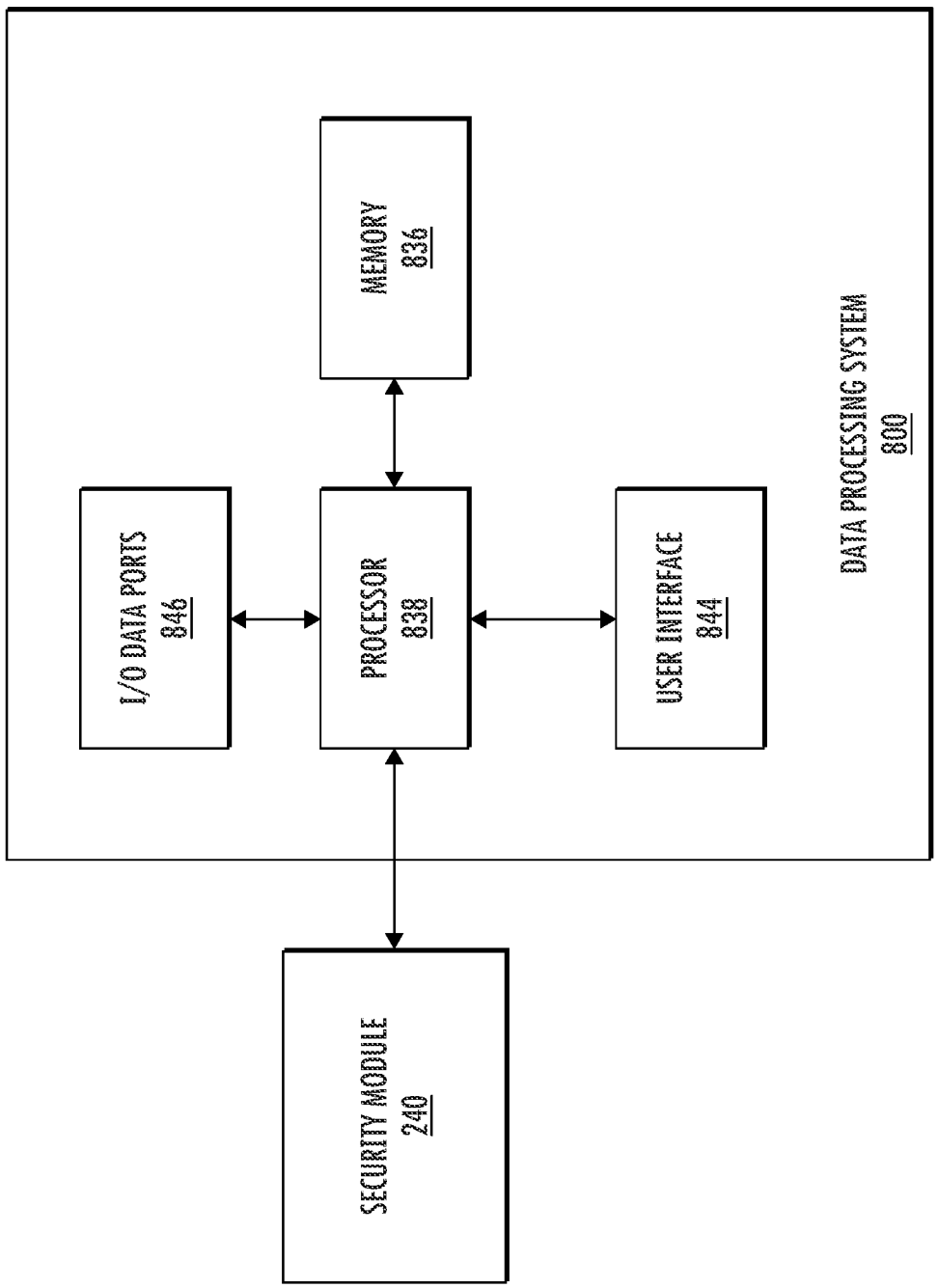

SYSTEMS, METHODS AND COMPUTER PROGRAM PRODUCTS FOR BRANCHING BASED AUTOMATION DRIVEN ANALYSIS

CLAIM OF PRIORITY

The present application claims the benefit of and priority to U.S. Provisional Application No. 63/264,677 filed on Nov. 30, 2021, entitled System and Method for Infinitely Branching Based Automation Driven Analysis, the content of which is incorporated herein by reference as if set forth in its entirety.

FIELD

The present inventive concept generally relates generally to network security and, more particularly, to automation solutions for determining security issues in a network.

BACKGROUND

Cyberattacks are becoming more and more frequent in the world today and have steadily escalated in the last twenty years. Generally, a cyberattack includes any offensive maneuver that targets computer information systems, computer networks, infrastructures, or personal computer devices. Conventional approaches for combating cyberattacks are generally high-cost, complex solutions using disconnected point tools. These solutions generally don't provide the best approach for handling the growing frequency and complexity of cyberattacks.

Private and public sector organizations across the globe are continuously under attack by cyber criminals. As the frequency of these attacks have increased, the financial and competitive impact thereof is resulting in a decreased level of public trust in the organizations being attacked.

Conventional solutions typically fit into one of two categories, proactive and reactive solutions. Proactive solutions assist an organization with the identification of known vulnerabilities and improve the organization's defensive security posture providing the organization with the tools to repel an attack. Reactive solutions, on the other hand, assume an organization has already been attacked successfully and the system thereof has been compromised. These reactive solutions attempt to identify where, how and when the attack has happened and spread to possibly avoid these same vulnerabilities going forward.

A particular challenge in improving proactive solutions that secure the defensive security posture of an organization lies in a level of effort and visibility. Conventional solutions are largely limited to reviewing software vulnerabilities and, in particular, information technology (IT) domains or IT technology areas. These solutions generally provide historical, not real-time information. Thus, the information is dated the moment the audit is completed. Thus, improved methods and systems are desired.

SUMMARY

Embodiments of the present disclosure provide systems for identifying vulnerabilities in an environment and providing solutions associated therewith, the system includes a security module that receives information from one or more assets in a target environment. The security module has a underlying knowledge of details associated with each of the one or more assets. The security module evaluates the received information from each of the one or more assets to identify any security vulnerabilities associated with the one or more assets and applies one or more rules to received information provided by assets having identified security issues. The one or more rules trigger a plurality of logic flows that analyze the received information provided by assets having identified security issues. The logic flows are configured to infinitely branch during analysis of the received information until a decision is determined for each of the assets having identified security issues. A remedial process is generated to address the identified security issues based on the determined decision for each of the assets having identified security issues. Related methods and computers are also provided.

BRIEF DESCRIPTION OF THE DRAWINGS

Throughout the drawings, reference numbers can be reused to indicate correspondence between referenced elements. The drawings are provided to illustrate embodiments of the present disclosure and do not limit the scope thereof.

FIG. 4 is a table detailing the various components of the security module in accordance with some embodiments of the present inventive concept.

FIGS. 6A and 6B are block diagrams illustrating machine learning system 600 in accordance with some embodiments of the present inventive concept.

FIG. 8 is a block diagram of a data processing system that may be present in any device in accordance with some embodiments of the present inventive concept.

DETAILED DESCRIPTION

Figure 1:
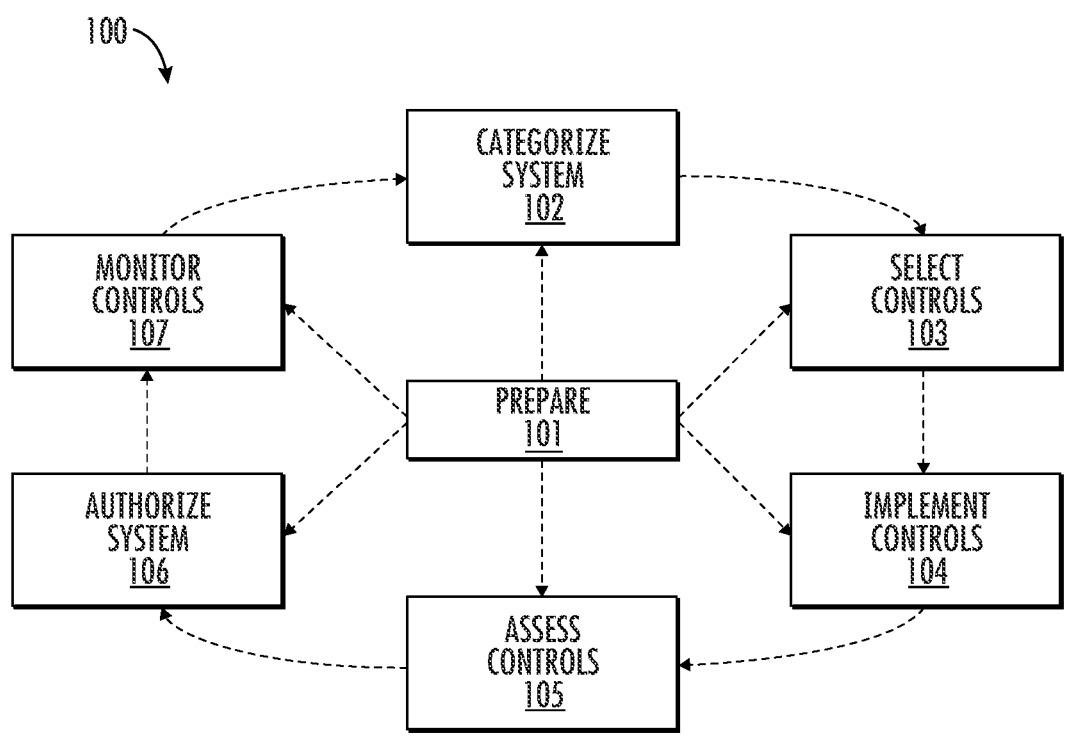
FIG. 1 is a diagram illustrating an example risk management framework (RMF).

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

As will be appreciated by one of skill in the art, the inventive concept may be embodied as a method, data processing system, or computer program product. Accordingly, the present inventive concept may take the form of an entirely hardware embodiment or an embodiment combining software and hardware aspects all generally referred to herein as a "circuit" or "module." Furthermore, the present inventive concept may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present inventive concept may be written in an object-oriented programming language such as Java®, Smalltalk or C++. However, the computer program code for carrying out operations of the present inventive concept may also be written in conventional procedural programming languages, such as the "C" programming language or in a visually oriented programming environment, such as VisualBasic or JavaFx.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The inventive concept is described in part below with reference to a flowchart illustration and/or block diagrams of methods, systems and computer program products according to embodiments of the inventive concept. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

As discussed briefly above, cyberattacks are becoming more and more frequent in the world today. As used herein, a "cyberattack" refers generally to any offensive maneuver that targets computer information systems, computer networks, infrastructures, or personal computer devices. For example, a cyber attack may be any kind of malicious activity that attempts to collect, disrupt, deny, degrade, or destroy information system resources or the information itself. Cyberattacks occur when an individual, group, or organized "gang" attempts to maliciously breach the security system of another person or organization. While this might prompt you to envision hackers breaking into an online banking system to steal billions, the most common example of a cyberattack is a data breach.

Common ways to prevent or reduce the likelihood of advanced cyberattacks include, for example, developing a vulnerability management program; conducting routine penetration testing; implementing security information and event management (SIEM). These conventional approaches for combating cyberattacks are generally high-cost, complex solutions that generally provide historical, not real-time information. Thus, the information is dated the moment the audit is completed.

Accordingly, some embodiments of the present inventive concept provide A comprehensive, integrated platform that can possibly prevent, detect, remediate and report on current risks in real time, while ensuring continuous self-upgrade and adaptation of the network and the assets therein. Embodiments of the present inventive concept utilize infinitely branching automation to determine security issues and device configuration problems in real-time to combat cyberattacks before the attack happens.

In particular, embodiments of the present inventive concept provide a near real-time solution covering core pillars of a sector's applicable cybersecurity Risk Management Framework (RMF). The RMF is a United States federal government guideline, standard and process for risk management to help secure information systems, for example, computers and networks developed by National Institute of Standards and Technology. FIG. 1 of the present application illustrates an example RMF 100 that provides a disciplined and structured process that integrates information security, privacy and risk management activities into the system development life cycle.

As illustrated in FIG. 1, the steps of the RMF 100 include preparing to execute the RMF by establishing a context and priorities for managing security and privacy risk at organizational and system levels (step 101). The information system and the information processed, stored, and transmitted by that system are categorized based on an impact analysis (step 102). An initial set of baseline security controls is set for the information system based on the security categorization; tailoring and supplementing the security control baseline as needed based on an organizational assessment of risk and local conditions (step 103). If any overlays apply to the system they are added in step 103. The security controls identified in step 103 are implemented (step 104). A third party is allowed to assess the controls and verify that the controls are properly applied to the system (step 105). It is decided whether the information system is granted or denied an Authorization to Operate (ATO), in some cases it may be postponed while certain items are fixed (step 106). The ATO is based on the report from the Assessment phase (step 105). ATO is typically granted for a designated number of years, for example, up to 3 years, and the process is generally repeated at the end of the designated period. The security controls in the information system are monitored continuously in a pre-planned fashion as documented earlier in the process (step 107).

It will be understood that the RMF 100 illustrated in FIG. 1 is provided as an example only and embodiments of the present inventive concept are not limited thereto. The blocks illustrating steps 101-107 in FIG. 1 may be different, provided in a different or combined without departing from the scope of the present inventive concept.

As discussed, embodiments of the present inventive concept provide a near real-time solution covering core pillars of a sector's applicable cybersecurity Risk Management Framework (RMF). As used herein, near real-time refers no more than 150 ms-200 ms. Thus, if a vulnerability is identified, a notification is issued within 150-200 ms. In some embodiments, once the vulnerability is identified, the system may wait a period of time and check again before the full audit of the vulnerability is launched.

Herein, these core pillars include Software Vulnerabilities, Security Controls, Asset Lifecycle and Operational Process with an integrated Waiver system supporting Plan of Action & Milestones and Risk Acceptance. The analytics-driven risk management platform of embodiments discussed herein offers the ability to audit and remediate vulnerabilities in the whole system. In other words, the development platform discussed herein spans endpoints, applications, Internet of Things (IOT), industrial control systems, networks devices, servers, cloud-based devices and the like.

Existing solutions that are used to combat cyberattacks use rudimentary automation, and are generally unable to either support or properly analyze devices for vulnerabilities. Organizations rely on personnel to manually determine the security posture of assets and finding vulnerabilities. This method extends the time between a vulnerability being announced and its remediation, allowing attackers more time with access to the system to leverage the attack vectors. Conventional solutions have largely focused on software vulnerabilities and do not address the various other types of vulnerabilities outlined in the Risk Management Framework pillars discussed above.

As a result, organizations are unprepared to defend their organization environments from cyberattacks. This has resulted in a drastic increase in cyber security insurance. For example, in some instances cyber security insurance has increased more than six times original pricing. In some cases, insurers have been forced to discontinue cyber security insurance products.

Embodiments of the present inventive concept use methods and systems for infinitely branching automation to determine security issues and device configuration problems in a target environment. The method used automation to self-adapt to understand whether the applicable technology is used in a secure manner. This aspect of the present inventive concept is critical because the security module is able to determine if any applicable "use-case scenarios" exists. If these use case scenarios do exist, the security module in accordance with embodiments discussed herein can apply the appropriate context/use-case scenario/branch specific information and corrective actions.

For example, in a conventional system when a vulnerability is identified in an asset, for example, a smart phone, the conventional system may identify the serial number of the phone, the operating system running thereon and decide if there is a problem with the phone. Embodiments of the present inventive concept perform a deeper analysis. The security module herein follows every thread until the problem is identified. The information identified by the security module is then provided to, for example, an engineer so that the engineer has the information to fix the issue with the asset.

Embodiments of the present inventive concept provide a security module that implements a comprehensive, integrated platform that can possibly prevent, detect, remediate and report on risks, while simultaneously ensuring continuous self-upgrade and adaptation of the assets in a target environment as will be discussed further below with respect to the Figures.

Figure 2:
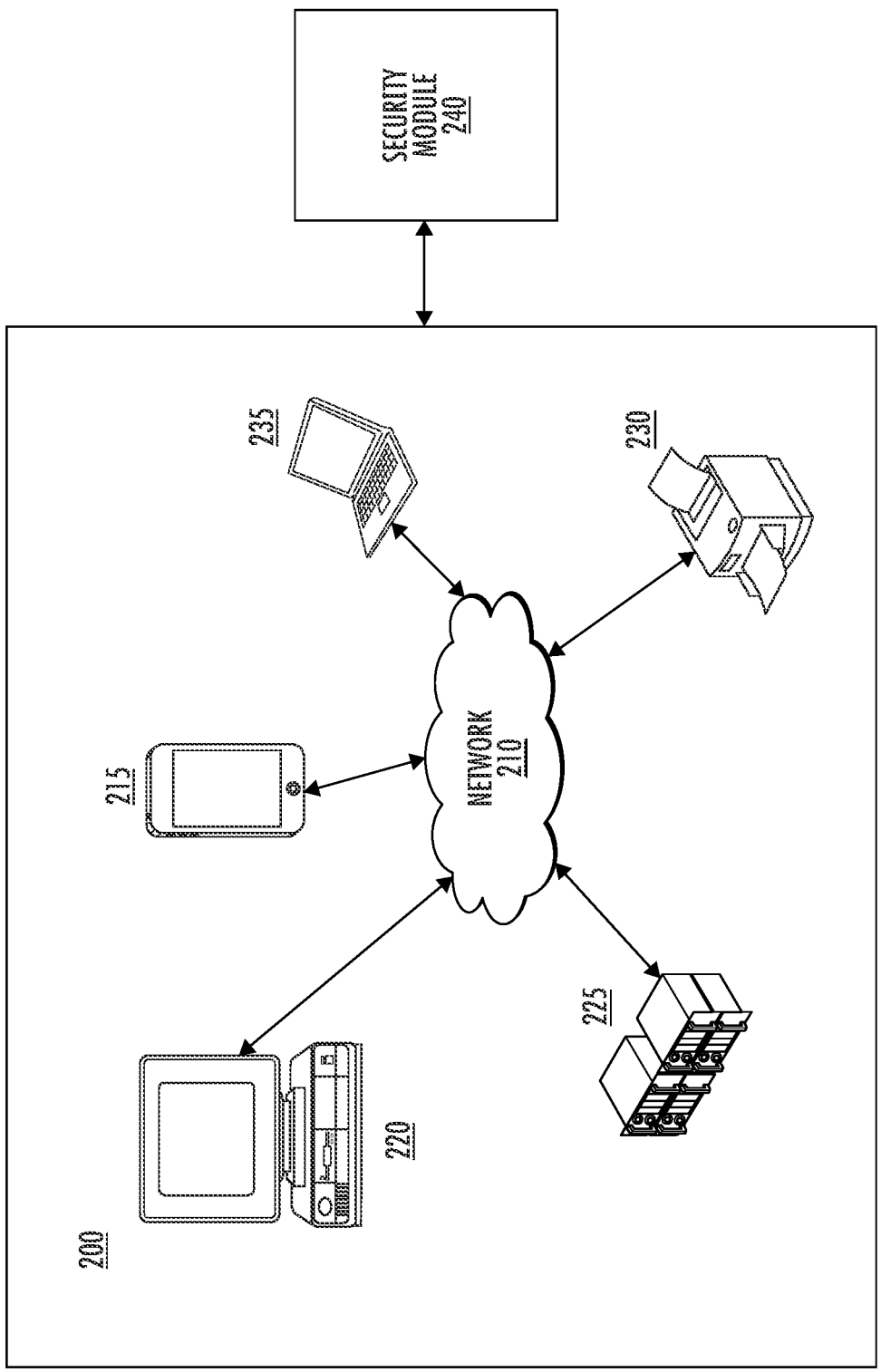
FIG. 2 is a diagram illustrating an example organization environment including a security module in accordance with embodiments of the present inventive concept may be utilized.

Referring now to FIG. 2, an example organizational environment 200 (target environment) in communication with a security module 240 in accordance with some embodiments of the present inventive concept. It will be understood that the environment 200 is provided as an example only and, therefore, embodiments of the present inventive concept are not limited thereto.

As illustrated in FIG. 2, the security module 240 communicates with the environment 200 that includes a network 210. The network 210 could be any type of network, for example, a campus area network (CAN); an enterprise private network (EPN); a local area network (LAN); a metropolitan area network (MAN); a passive optical LAN (POLAN); a personal area network (PAN); storage area network (SAN); a virtual private network (VPN); a wide area network (WAN); a wireless local area network (WLAN) and the like. The network 210 is in communication with the assets of the environment 200. In FIG. 2, the assets include a smart phone or device 215, a desktop computer 220, a server 225, a networked printer/scanner 230 and a lap top computer 235. It will be understood that the assets could further include data centers, other larger networks, routers and the like without departing from the scope of the present inventive concept. The assets in the environment 200 may communicate either wirelessly or over a wired communication line.

As used herein, a network asset refers to the apparatus, equipment, plant and buildings used to provide or in connection with providing covered services on the network, which assets are either connection assets or shared assets. Network assets can vary from hardware (routers, switches, hubs, firewalls, printers, hosts, servers and wireless access points) to software assets like operating systems (OS), applications, patches and updates. An IT asset is any company-owned information, system or hardware that is used in the course of business activities. The security module 240 in accordance with embodiments of the present inventive concept communicate with the assets, obtain information therefrom, analyze the obtained information and use the results of the analysis to possibly prevent, detect, remediate and report on risks associated with the environment.

Figure 3:
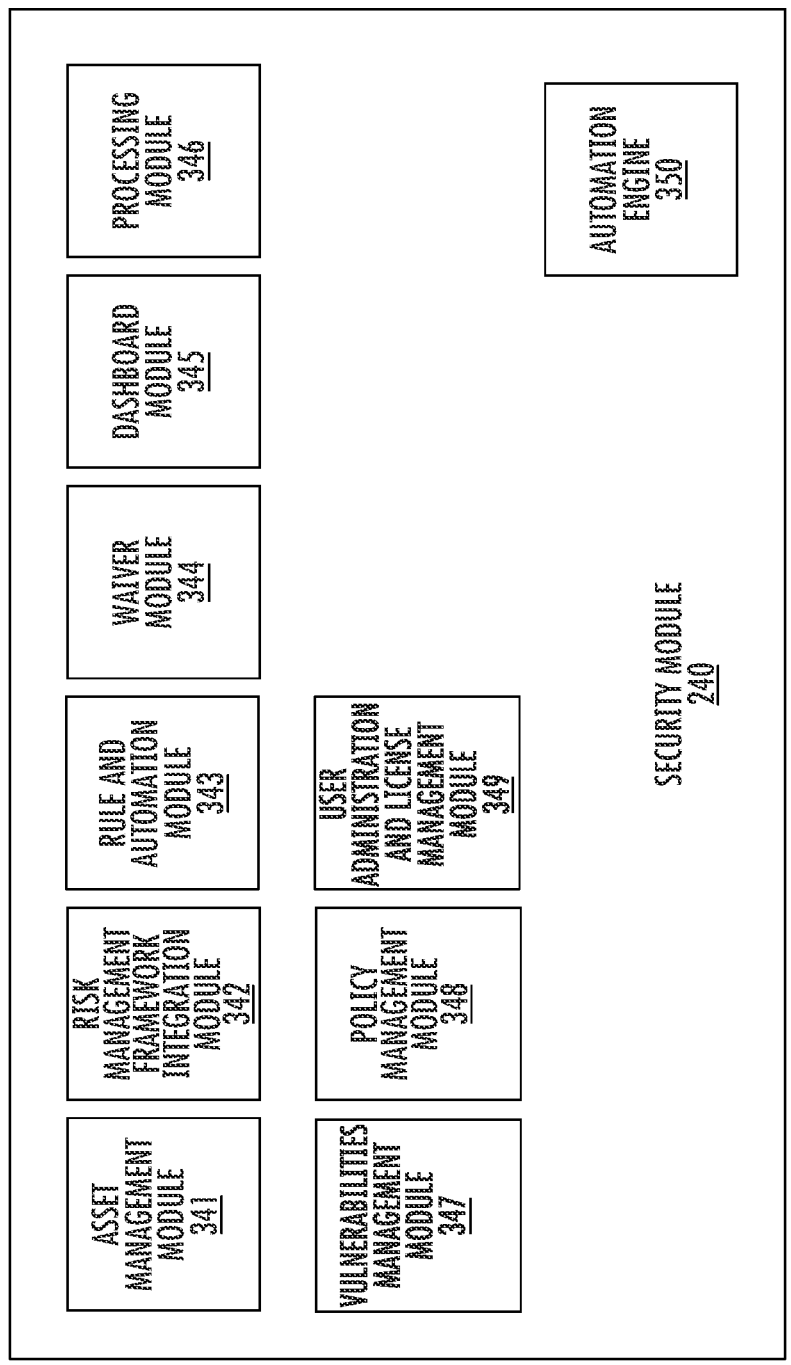
FIG. 3 is a more detailed block diagram of example components included in a security module in accordance with some embodiments of the present inventive concept.

Referring now to FIG. 3, a block diagram of the security module 240 that may include various modules that implement different aspects of the present inventive concept will be discussed. FIG. 3 includes modules corresponding to the first column of the table in FIG. 4 entitled "Functional Components." Although the additional columns of the table in FIG. 4 are not shown in the block diagram of FIG. 3, the "solution components" of column 2 and/or the "technology components" of column 3 may each have a dedicated module or may be combined with another module to perform the function thereof without departing from the scope of the present inventive concept.

Referring now to FIGS. 3 and 4, details of the security module 240 that implements an analytics-driven risk management platform in accordance with embodiments of the present inventive concept will be discussed. It will be understood that the platform discussed herein can be provided in different form factors, such as on-premises, cloud, portable and the like without departing from the scope of the present inventive concept. Any possible form factor may be used and the list of form factors is not exhaustive. Embodiments of the present inventive concept may be implemented in multiple environments and/or form factors which can be applied to the various IT domains such as servers, workstations, applications, network infrastructure, cloud services, cloud infrastructure, IOT, Industrial Controls and the like. For example, some embodiments of the present inventive concept may involve a database, web services, and communication with assets on a digital platform. The security module 240 gathers information from the assets in the environment, and this information is used by the infinitely branching automation engine/module 343 to determine an outcome. The outcome is then used to secure the environment by addressing the various issued identified in the outcome.

As illustrated in FIG. 3, the security module 240 includes various modules that implement the various functions thereof. The security module of FIG. 3 includes an asset management module 341, a risk management framework integration module 342, a rule and automation module/engine 343, a waiver module 344, a dashboard module 345, a processing module 346, a vulnerabilities module 347, a policy management module 348 and a user administration and license management module 349. These modules are provided as examples only, more modules may be added, modules may be removed and/or combined without departing from the scope of the present inventive concept.

The security module 240 and the associated modules provide an agile low code method of tightly integrating the RMF requirements discussed above with the rules using the automation module 343. The security module uses logic to implement an infinitely branching and dynamically adjusting automation module to ensure higher levels of precision and scale rapid development of rules and remediation actions in real-time.

The automation module/engine 343 uses unique techniques that allow provision of these attributes. This capability can be used for a variety of purposes outside of cybersecurity.

As illustrated in FIG. 2, the security module 240 is connected to a network 210 which has either direct or indirect access to one or more assets. The security module 240 actively collects and communicates with the target asset as needed to determine any security deficiencies or information that may indicate a potential security deficiency. The security module 240 reviews the applicable security guidelines and the affirmatively addressed any located security gaps. In some embodiments, the security module 240 utilized a web server that allows users to directly access and configure the security module 240 and/or assets associated therewith.

Some embodiments of the present inventive concept can be separated to support a distributed scalable design and/or utilize micro services. The security module 240 can dynamically detect asset security or configuration gaps allowing it to provide near real time visibility. This allows for continuous monitoring of an environment's (200) security posture.

The security module 240 supports linking analysis rules logically to one or more business rules. This abstracts the analysis rules allowing the security module 240 to provide context driven information based on the applicable geography, sector, or industry.

A waivers (Plan of Action and milestones (POA&M) and Risk Acceptance) module 344 of the security module 240 is used to manage security gaps. This may allow the user to know how each vulnerability is or is not being resolved, which is reflected on the reports and dashboards (345) by showing the applicable information about the vulnerabilities (347). This module can supersede the analysis driven by the infinitely branching automation engine (343).

The above information may be used to calculate a "risk score" in near real time based on the vulnerability rating (347). The risk score may be used to prioritize which assets and vulnerabilities should be addressed first. As used herein, the "risk score" refers to any value or symbol that may be used to enumerate detected vulnerabilities in the system. The vulnerabilities identified by the security module discussed herein are used to generate the risk score. Any risk score known or unknown may be used without departing from the scope of the present inventive concept.

As briefly discussed above, embodiments of the present inventive concept assess the security and configuration gaps of assets using infinitely branching analytics security module/engine to direct automation actions and determine outcomes. The security module orchestrates asset configuration changes to achieve a desired outcome or behavior based on the analytics or organizational objectives.

Embodiments of the present inventive concept allow an organization to identify gaps between their "as is" cyber security posture and "desired state" security posture in near real time, every time any configuration change happens in the network.

Embodiments discussed herein can overlay various aspects of security guidelines, business outcomes and risk management frameworks into a collapsed stack utilizing a low code rule logic to drive the infinitely branching automation module/engine.

The security module can be implemented/deployed/consumed in multiple form factors utilizing traditional or distributed computer designs. The Waiver module 344 supersedes the automation analysis based on business, risk or applicability overrides called Plan of Action & Milestones and Risk Acceptance.

Figure 5:
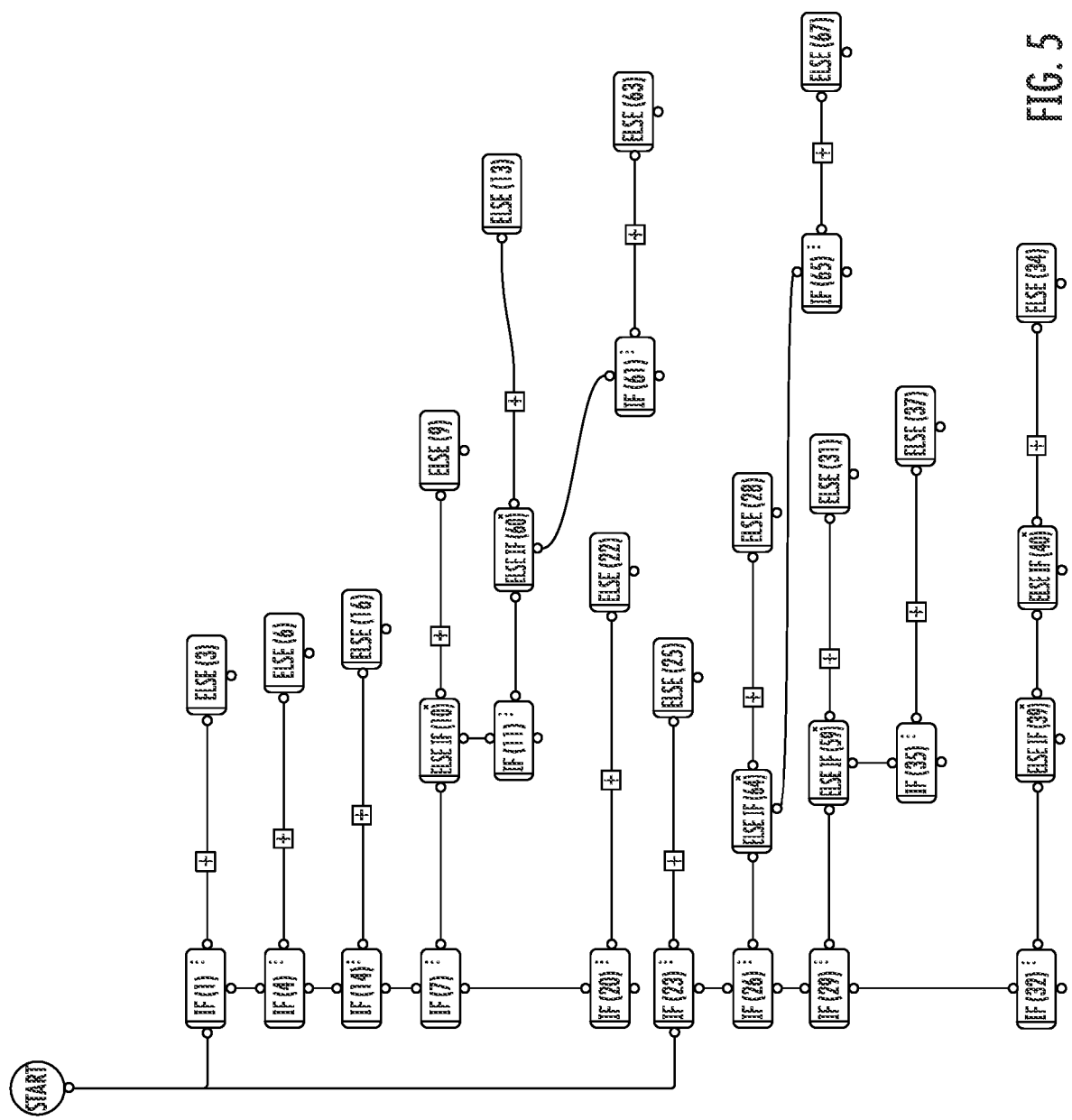
FIG. 5 is an example screen shot of a graphical user interface illustrating infinite branching in accordance with some embodiments of the present inventive concept.

Referring now to FIG. 5, a screen shot of an graphical user interface (GUI) that may be supported by the security engine 240 in accordance with various embodiments of the present inventive concept will be discussed. As illustrated in FIG. 5, the user has choices of "views", for example, details, input variable and logic. The GUI in FIG. 5 illustrates the logic for a particular asset monitored by the security module 240. In particular, the screen shot of FIG. 5 is a simple example that highlights multiple logic flows (roots) with their own analysis flows that can branch (else if) which are used to analyze streams of information based on the security issue being reviewed.

The screen shot of FIG. 5 illustrates at least four aspects of the present inventive concept. First, the screen shot illustrates the security module's ability to infinitely branch the analysis (decision tree) using, for example, "else if", to achieve the desired analysis objective. This is particularly useful when analyzing information collected by the security module and platform where the logic understands all the plausible streams of information to produce an authoritative decision. It will be understood that embodiments of the present inventive concept are not limited to a single logic flow for determining the current security state of an asset.

It will be understood that else if, as its name suggests, is a combination of if and else from a programming perspective. Like "else", it extends an "if" statement to execute a different statement in case the original if expression evaluates to false.

The second thing the screen shot of FIG. 5 illustrates logic flows (roots) operating in parallel, for example, IF 1 and IF 23 of FIG. 5 analyzing different streams of data. Each stream may be referred to as a root and each root has the ability to infinitely branch its analysis as discussed above. It will be understood that in some embodiments, rules with each logic flow may also be running in parallel.

Third, the contents of each IF and ELSE IF as illustrated in the screen shot of FIG. 5 are used to direct the analysis/logic flow which, in some embodiments, dynamically adjusts based on the information within the flows to achieve the proper current state decision.

And finally, the current state decision is used by the security module to dynamically generate a method to change the information collected by an asset, for example, IT Device, IT software, Internet of Things, Industrial control, and the like to modify the operational behavior of the asset.

These functions together allow the security module to identify Cyber Security issue(s) on the assets and then interact with the asset to resolve the security issue(s) prior to the potential attack. The unique capability for security module in accordance with embodiments discussed herein to dynamically adjust to all of the ways an asset can use a particular technology or be exposed to a specific security vulnerability allows the security module the precision and accuracy needed to help understand where security issues do and do not exist. Once the vulnerable areas are identified, a dynamically adjusting automated remediation may be generated to address the security concerns and/or vulnerabilities.

It will be understood that in some embodiments the rules may be static and the flows are pre-determined for the static rules. In other words, once a rule is written, the flows (IF, ELSE/IF, ELSE and the like) are hard coded and will not change at run time. The path which the rule may take will change based on the information coming from the devices. In these embodiments, this is good because this ensures that the behavior is deterministic and there will be no surprises. At the same time, it is not dynamic because the flow will not evolve (No new If/else if/else paths will be created dynamically) based on the information provided but will take the path as coded in the rules logic.

However, in other embodiments the security module is more dynamic and the flow and rules may evolve. In these embodiments, though the flows (IF, ELSE/IF and ELSE) are hard coded, the path to each flow may be based on the dynamic values generated by the regex expressions coming from the device commands. These values may be generated in real time when the audits are running and based on these values, the rules execution may take different path through the defined flows providing a more dynamic system overall. The more dynamic version of the security module may implement machine learning (MI) and/or artificial intelligence (AI) modules to provide the dynamic nature of the system. These aspects of the present inventive concept are discussed further below.

In particular, one or more portions of the method/system discussed herein can include any various machine learning techniques, such as supervised machine learning and/or unsupervised machine learning. For example, a supervised machine learning approach can be used to train a neural network to identify a data that may indicate a possible security breach, identify rules to assess the potential breach, and/or identify possible solutions to address the identified breach.

Referring to FIG. 6A, a diagram illustrating an example of training a machine learning model 600 in connection with some embodiments of the present inventive concept will be discussed. The machine learning model training described herein may be performed using a machine learning system. The machine learning system may include or may be included in a computing device, a server, a cloud computing environment, or the like, such as the security module 240 discussed herein.

As shown by reference number 605, a machine learning model may be trained using a set of observations. The set of observations may be obtained and/or input from historical data or real time data, such as data gathered during one or more processes described herein. For example, the set of observations may include data gathered by the security module 240 about assets in the target environment, as described elsewhere herein. In some implementations, the machine learning system may receive the set of observations (e.g., as input) from security module 240 or from a storage device.

As shown by reference number 610, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values.

In some implementations, the machine learning system may determine variables for a set of observations and/or variable values for a specific observation based on input received from the security module 240. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values.

In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of anomaly presence, a second feature of asset effected, a third feature of rule selection, and so on. As shown, for a first observation, the first feature may have a value of "yes", the second feature may have a value of "no", the third feature may have a value of "Rule 1", and so on. These features and feature values are provided as examples and may differ in other examples. For example, the feature set may include one or more of the following features: notifications, reminders, queries, analytics, waivers and the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

The set of observations may be associated with a target variable 615. The target variable 615 may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No, Male or Female), among other examples. A target variable may be associated with a target variable value, and a target variable value may be specific to an observation. In some cases, different observations may be associated with different target variable values. In example 600, the target variable 615 is a determination of whether a solution should be implemented, which has a value of "Yes" for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 620 that includes a first subset of observations of the set of observations, and a test set 625 that includes a second subset of observations of the set of observations. The training set 620 may be used to train (e.g., fit or tune) the machine learning model, while the test set 625 may be used to evaluate a machine learning model that is trained using the training set 620. For example, for supervised learning, the test set 625 may be used for initial model training using the first subset of observations, and the test set 625 may be used to test whether the trained model accurately predicts target variables in the second subset of observations. In some implementations, the machine learning system may partition the set of observations into the training set 620 and the test set 625 by including a first portion or a first percentage of the set of observations in the training set 620 (e.g., 75%, 80%, or 85%, among other examples) and including a second portion or a second percentage of the set of observations in the test set 625 (e.g., 25%, 20%, or 15%, among other examples). In some implementations, the machine learning system may randomly select observations to be included in the training set 620 and/or the test set 625.

As shown by reference number 630, the machine learning system may train a machine learning model using the training set 620. This training may include executing, by the machine learning system, a machine learning algorithm to determine a set of model parameters based on the training set 620. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 620). For example, for a regression algorithm, a model parameter may include a regression coefficient (e.g., a weight). For a decision tree algorithm, a model parameter may include a decision tree split location, as an example.

As shown by reference number 635, the machine learning system may use one or more hyperparameter sets 640 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 620. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 620. The machine learning system may tune each machine learning algorithm using one or more hyperparameter sets 640 (e.g., based on operator input that identifies hyperparameter sets 640 to be used and/or based on randomly generating hyperparameter values). The machine learning system may train a particular machine learning model using a specific machine learning algorithm and a corresponding hyperparameter set 640. In some implementations, the machine learning system may train multiple machine learning models to generate a set of model parameters for each machine learning model, where each machine learning model corresponds to a different combination of a machine learning algorithm and a hyperparameter set 640 for that machine learning algorithm.

In some implementations, the machine learning system may perform cross-validation when training a machine learning model. Cross validation can be used to obtain a reliable estimate of machine learning model performance using only the training set 620, and without using the test set 625, such as by splitting the training set 620 into a number of groups (e.g., based on operator input that identifies the number of groups and/or based on randomly selecting a number of groups) and using those groups to estimate model performance. For example, using k-fold cross-validation, observations in the training set 620 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 640 associated with a particular machine learning algorithm. The machine learning system may compare the overall cross-validation scores for different hyperparameter sets 640 associated with the particular machine learning algorithm, and may select the hyperparameter set 640 with the best (e.g., highest accuracy, lowest error, or closest to a desired threshold) overall cross-validation score for training the machine learning model. The machine learning system may then train the machine learning model using the selected hyperparameter set 640, without cross-validation (e.g., using all of data in the training set 620 without any hold-out groups), to generate a single machine learning model for a particular machine learning algorithm. The machine learning system may then test this machine learning model using the test set 625 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 645 to be used to analyze new observations, as described below in connection with FIG. 6B.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 620 (e.g., without cross-validation), and may test each machine learning model using the test set 625 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 645.

As indicated above, FIG. 6A is provided as an example. Other examples may differ from what is described in connection with FIG. 6A. For example, the machine learning model may be trained using a different process than what is described in connection with FIG. 6A. Additionally, or alternatively, the machine learning model may employ a different machine learning algorithm than what is described in connection with FIG. 6A, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 6B:
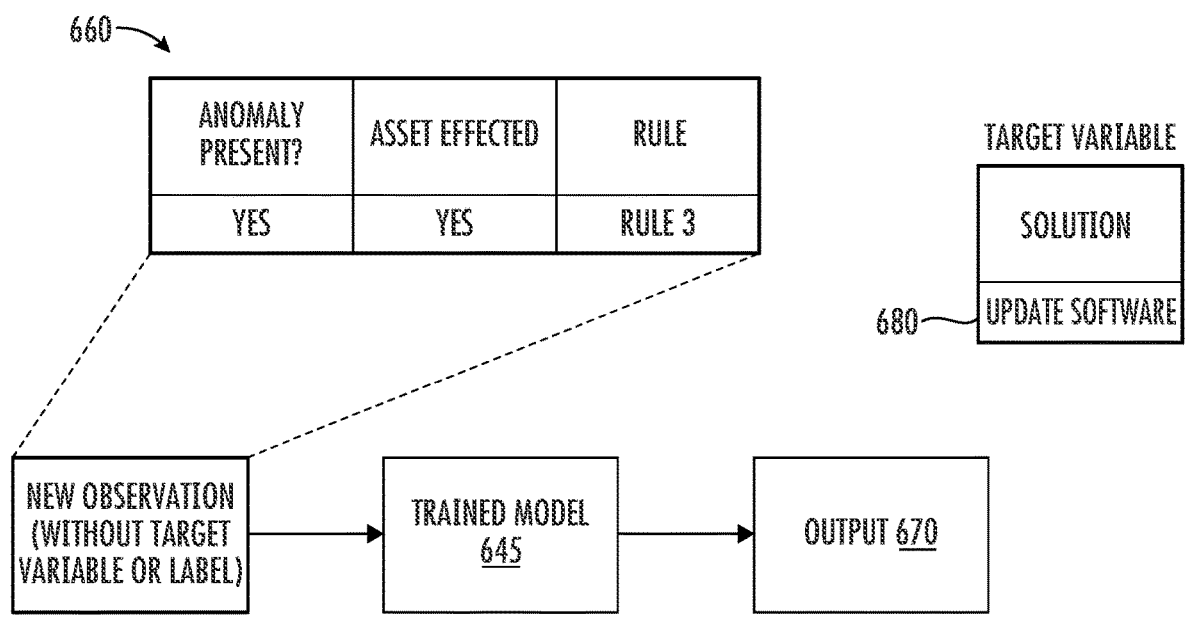

FIG. 6B is a diagram illustrating an example of applying a trained machine learning model to a new observation associated with identifying anomalies and solutions in an environment. The new observation may be input to a machine learning system that stores a trained machine learning model 645, such as the trained machine learning model 645 described above in connection with FIG. 6A. The machine learning system may include or may be included in a computing device, a server, or a cloud computing environment, such the security module 240.

As shown by reference number 660, the machine learning system may receive a new observation (or a set of new observations), and may input the new observation to the machine learning model. As shown, the new observation may include a first feature of "anomaly present?," a second feature of "asset effected?," a third feature of "Rule applied," and so on, as an example. The machine learning system may apply the trained machine learning model 645 to the new observation to generate an output 670 (e.g., a result). The type of output may depend on the type of machine learning model and/or the type of machine learning task being performed. For example, the output 670 may include a predicted (e.g., estimated) value of target variable (e.g., a value within a continuous range of values, a discrete value, a label, a class, or a classification), such as when supervised learning is employed. Additionally, or alternatively, the output 670 may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 645 may predict a value of "update software" for the target variable of solution for the new observation, as shown by reference number 680. Based on this prediction (e.g., based on the value having a particular label or classification or based on the value satisfying or failing to satisfy a threshold), the machine learning system may provide a recommendation and/or output for determination of a recommendation. Additionally, or alternatively, the machine learning system may perform an automated action and/or may cause an automated action to be performed (e.g., by instructing another device to perform the automated action). As another example, if the machine learning system were to predict a value of "unknown" or similar for the target variable of solution, then the machine learning system may provide a different recommendation (e.g., "manually check asset") and/or may perform or cause performance of a different automated action (e.g., reboot asset). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In this way, the machine learning system may apply a rigorous and automated process to determine asset vulnerabilities and the solutions thereto. The machine learning system enables recognition and/or identification of tens, hundreds, thousands, or millions of features and/or feature values for tens, hundreds, thousands, or millions of observations, thereby increasing accuracy and consistency and reducing delay associated with breach identification to the required resources (e.g., computing or manual) to be allocated for tens, hundreds, or thousands of operators to manually determine the vulnerabilities in the system.

As indicated above, FIG. 6B is provided as an example. Other examples may differ from what is described in connection with FIG. 6B.

Figure 7:
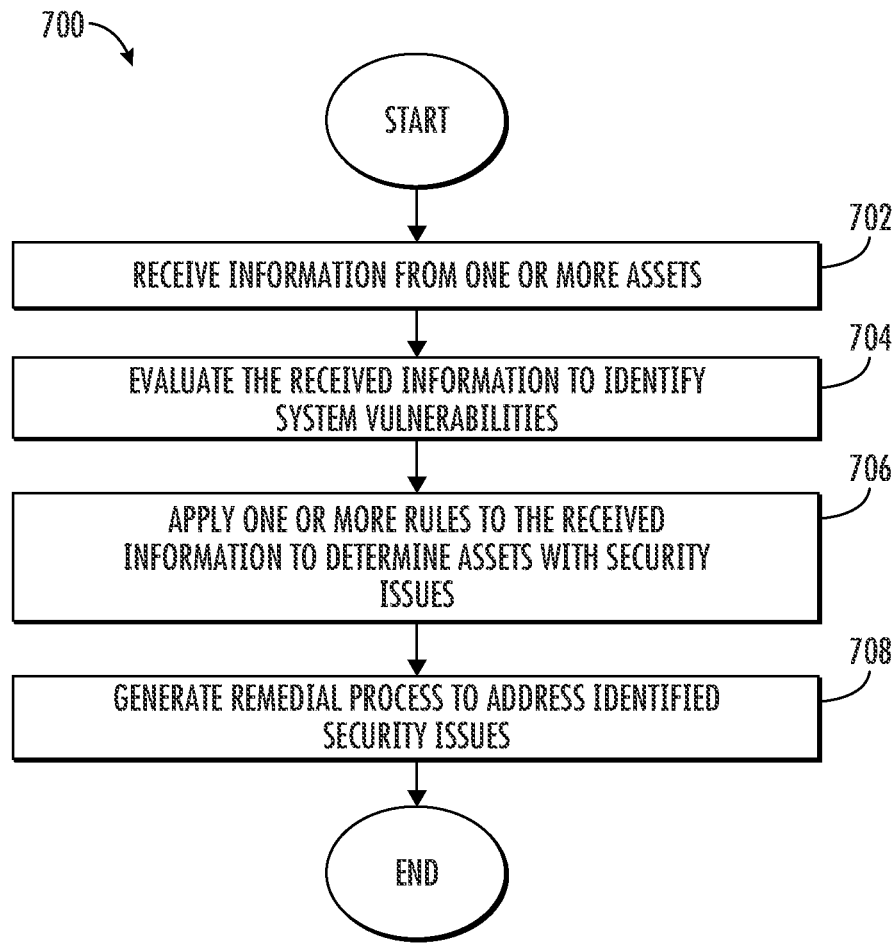
FIG. 7 is a flowchart illustrating operations for identifying vulnerabilities in an environment and providing solutions associated therewith in accordance with some embodiments of the present inventive concept.

Referring now to FIG. 7, a flowchart illustrating operations in accordance with some embodiments of the present inventive concept will be discussed. As illustrated in FIG. 7, operations begin at block 702 by receiving, at a security module, information from one or more assets in a target environment (block 702). The security module has a underlying knowledge of details associated with each of the one or more assets. The received information from each of the one or more assets is evaluated to identify any security vulnerabilities associated with the one or more assets (block 704). One or more rules are applied to received information provided by assets having identified security issues (block 706). The one or more rules trigger a plurality of logic flows that analyze the received information provided by assets having identified security issues, the logic flows configured to infinitely branch during analysis of the received information until a decision is determined for each of the assets having identified security issues. A remedial process is generated to address the identified security issues based on the determined decision for each of the assets having identified security issues (block 708).

In some embodiments, the plurality of logic flows may be running in parallel analyzing different portions of the received information provided by assets having identified security issues to provide decision and/or the remedial process in real-time.

In some embodiments, each logic flow may be configured to infinitely branch by branching as many times as necessary to perform the analysis needed to provide the decision.

In some embodiments, the method may further include applying the one or more rules to direct analysis of the logic flows that dynamically adjust based on the received information provided by assets having identified security issues.

In some embodiments, the method may further include generating the remedial process using the decision to dynamically generate a process to address security issues.

In some embodiments, the method may further include self-adapting to understand whether applicable technology at the one or more assets is used in a secure manner.

Embodiments of the present inventive concept manipulate data to calculate various parameters. Accordingly, some sort of data processing is needed to create and store the data and communicate with the security module 240. FIG. 8 is a block diagram of an example of a data processing system 800 suitable for use in the systems in accordance with embodiments of the present inventive concept. The data processing may take place in any of the devices (or all of the devices) in the system without departing from the scope of the present inventive concept. As illustrated in FIG. 8, the data processing system 2100 includes a user interface 844 such as a keyboard, keypad, touchpad, voice activation circuit or the like, I/O data ports 846 and a memory 836 that communicates with a processor 838. The I/O data ports 846 can be used to transfer information between the data processing system 800 and another computer system or a network. These components may be conventional components, such as those used in many conventional data processing systems, which may be configured to operate as described herein.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Furthermore, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Furthermore, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A system for identifying vulnerabilities in an environment and providing solutions associated therewith, the system comprising:

a security module that:

retrieves information from one or more assets in a target environment by directly connecting to the one or more assets in real time, wherein the information comprises comprehensive structured and unstructured data, and wherein the security module has an underlying knowledge of details associated with each of the one or more assets based on the comprehensive structure and unstructured data from real-time queries, application protocol interface (API) integrations and/or secure remote scripts;

evaluates the retrieved information from each of the one or more assets in real time to identify any security vulnerabilities associated with the one or more assets; and applies one or more rules to retrieved information provided by assets having identified security issues, wherein the one or more rules trigger a plurality of logic flows that analyze the retrieved information provided by assets having identified security issues, the logic flows configured to infinitely branch during analysis of the retrieved information until a decision is determined for each of the assets having identified security issues, wherein the security module, upon a single collection of retrieved information from each of the one or more assets, automatically and dynamically applies the retrieved information to multiple of the one or more rules in parallel, the one or more rules adjusting in real-time based on values retrieved from the one or more assets such that multiple security issues are evaluated and resolved simultaneously without user intervention; and wherein the application of rules is performed without user intervention;

a processor; and a non-transitory computer readable medium to store a set of instructions for execution by the processor.

2. The system of claim 1, wherein the security module further generates a remedial process to address the identified security issues based on the determined decision for each of the assets having identified security issues.

3. The system of claim 2, wherein the plurality of logic flows are running in parallel analyzing different portions of the retrieved information provided by assets having identified security issues to provide decision and/or the remedial process in real-time.

4. The system of claim 1, wherein each logic flow is configured to infinitely branch by branching as many times as necessary to perform the analysis needed to provide the decision.

5. The system of claim 1, wherein the one or more rules are applied to direct analysis of the logic flows that dynamically adjust based on the retrieved information provided by assets having identified security issues.

6. The system of claim 1, wherein the security module generates a remedial process using the decision to dynamically generate a process to address security issues.

7. The system of claim 1, wherein the security module self-adapts to determine whether applicable technology at the one or more assets is used in a secure manner.

8. The system of claim 1, wherein the security module evaluates the retrieved data using core pillars of a sector's applicable risk management framework (RMF), wherein the core pillars include software vulnerabilities, security controls, asset lifestyle and operational process with an integrated waiver system supporting Plan of Action and milestones (POA&M).

9. A method for identifying vulnerabilities in an environment and providing solutions associated therewith, the method comprising:

retrieving, at a security module, information from one or more assets in a target environment by directly connecting to the one or more assets in real time, wherein the information comprises comprehensive structured and unstructured data, and wherein the security module has an underlying knowledge of details associated with each of the one or more assets based on the comprehensive structure and unstructured data from real-time queries, application protocol interface (API) integrations and/or secure remote scripts;

evaluating the retrieved information from each of the one or more assets in real time to identify any security vulnerabilities associated with the one or more assets;

applying one or more rules to retrieved information provided by assets having identified security issues, wherein the one or more rules trigger a plurality of logic flows that analyze the retrieved information provided by assets having identified security issues, the logic flows configured to infinitely branch during analysis of the retrieved information until a decision is determined for each of the assets having identified security issues, wherein the application of rules is performed without user intervention;

generating a remedial process to address the identified security issues based on the determined decision for each of the assets having identified security issues; and upon a single collection of retrieved information from each of the one or more assets, automatically and dynamically applying the retrieved information to multiple of the one or more rules in parallel, the one or more rules adjusting in real-time based on values received from the one or more assets such that multiple security issues are evaluated and resolved simultaneously without user intervention.

10. The method of claim 9, wherein the plurality of logic flows are running in parallel analyzing different portions of the retrieved information provided by assets having identified security issues to provide decision and/or the remedial process in real-time.

11. The method of claim 9, wherein each logic flow is configured to infinitely branch by branching as many times as necessary to perform the analysis needed to provide the decision.

12. The method of claim 9, further comprising applying the one or more rules to direct analysis of the logic flows that dynamically adjust based on the retrieved information provided by assets having identified security issues.

13. The method of claim 9, further comprising:

generating the remedial process using the decision to dynamically generate a process to address security issues; and self-adapting to determine whether applicable technology at the one or more assets is used in a secure manner.

14. A computer for identifying vulnerabilities in an environment and providing solutions associated therewith, the computer comprising:

one or more memories;

one or more hardware processors, communicatively coupled to the one or more memories, the one or more processors configured to:

retrieve information from one or more assets in a target environment by directly connecting to the one or more assets in real time, wherein the information comprises comprehensive structured and unstructured data, and wherein the security module has an underlying knowledge of details associated with each of the one or more assets based on the comprehensive structure and unstructured data from real-time queries, application protocol interface (API) integrations and/or secure remote scripts;

evaluate the retrieved information from each of the one or more assets in real time to identify any security vulnerabilities associated with the one or more assets;

apply one or more rules to retrieved information provided by assets having identified security issues, wherein the one or more rules trigger a plurality of logic flows that analyze the retrieved information provided by assets having identified security issues, the logic flows configured to infinitely branch during analysis of the retrieved information until a decision is determined for each of the assets having identified security issues, wherein the application of rules is performed without user intervention;

generate a remedial process to address the identified security issues based on the determined decision for each of the assets having identified security issues; and upon a single collection of retrieved information from each of the one or more assets, automatically and dynamically apply the retrieved information to multiple of the one or more rules in parallel, the one or more rules adjusting in real-time based on values received from the one or more assets such that multiple security issues are evaluated and resolved simultaneously without user intervention.

15. The computer of claim 14, wherein the one or more processors are configured to cause the plurality of logic flows to run in parallel analyzing different portions of the retrieved information provided by assets having identified security issues to provide decision and/or the remedial process in real-time.

16. The computer of claim 14, wherein each logic flow is configured to infinitely branch by branching as many times as necessary to perform the analysis needed to provide the decision.

17. The computer of claim 14, wherein the one or more processors causes the one or more rules to be applied to direct analysis of the logic flows that dynamically adjust based on the retrieved information provided by assets having identified security issues.

18. The computer of claim 14, wherein the one or more processors cause a security module to self-adapt to determine whether applicable technology at the one or more assets is used in a secure manner.

19. The computer of claim 14, wherein one or more processors are configured to evaluate the retrieved data using core pillars of a sector's applicable risk management framework (RMF), wherein the core pillars include software vulnerabilities, security controls, asset lifestyle and operational process with an integrated waiver system supporting Plan of Action and milestones (POA&M).

* * * * *